June 11, 1935.  E. J. SVENSON  2,004,399
FLUID TRANSMISSION
Filed Dec. 26, 1930   2 Sheets-Sheet 1
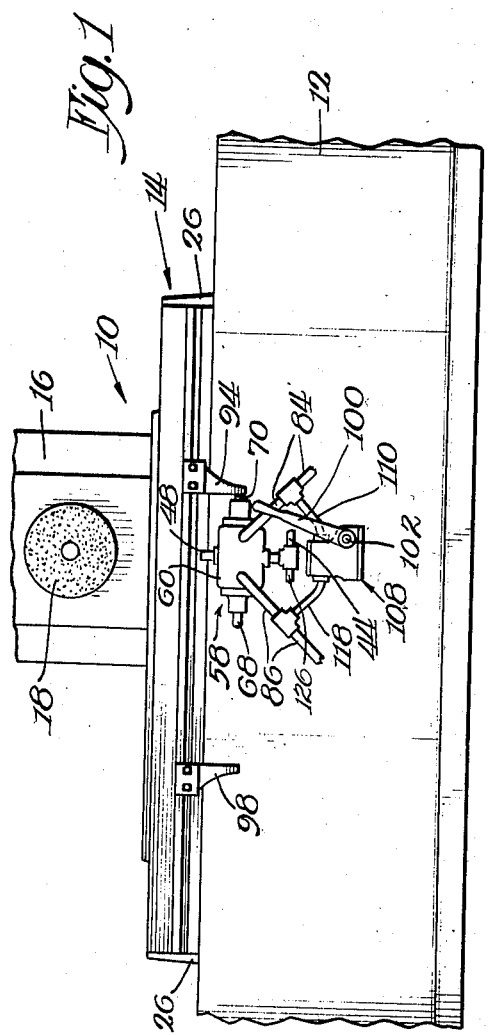
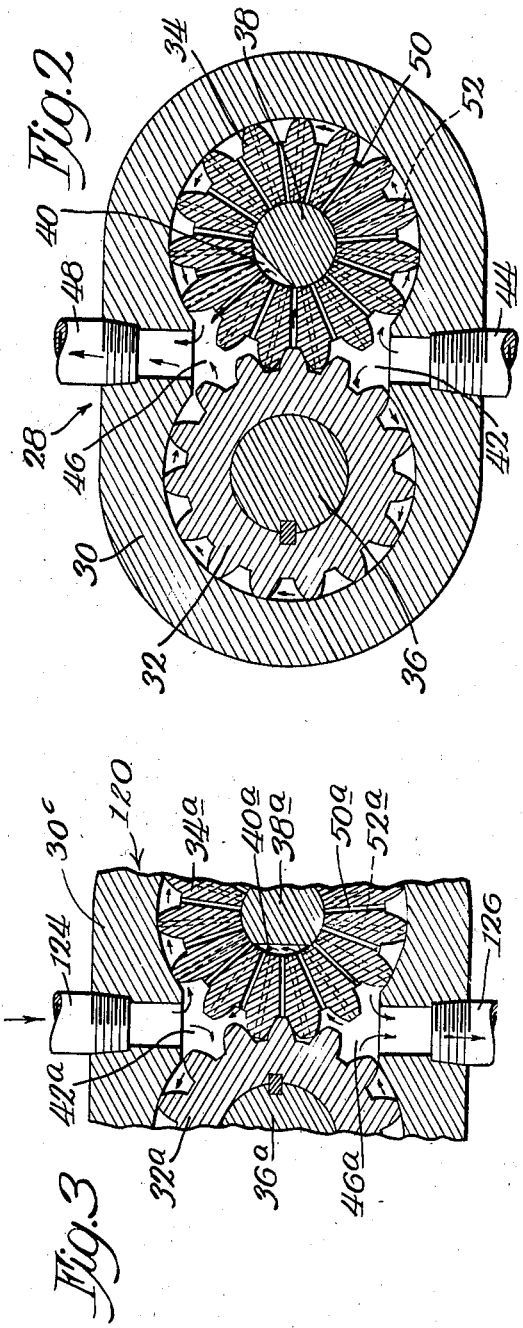
Inventor
Ernest J. Svenson
By Cheever, Cox & Moore Attys.

June 11, 1935.  E. J. SVENSON  2,004,399
FLUID TRANSMISSION
Filed Dec. 26, 1930  2 Sheets-Sheet 2
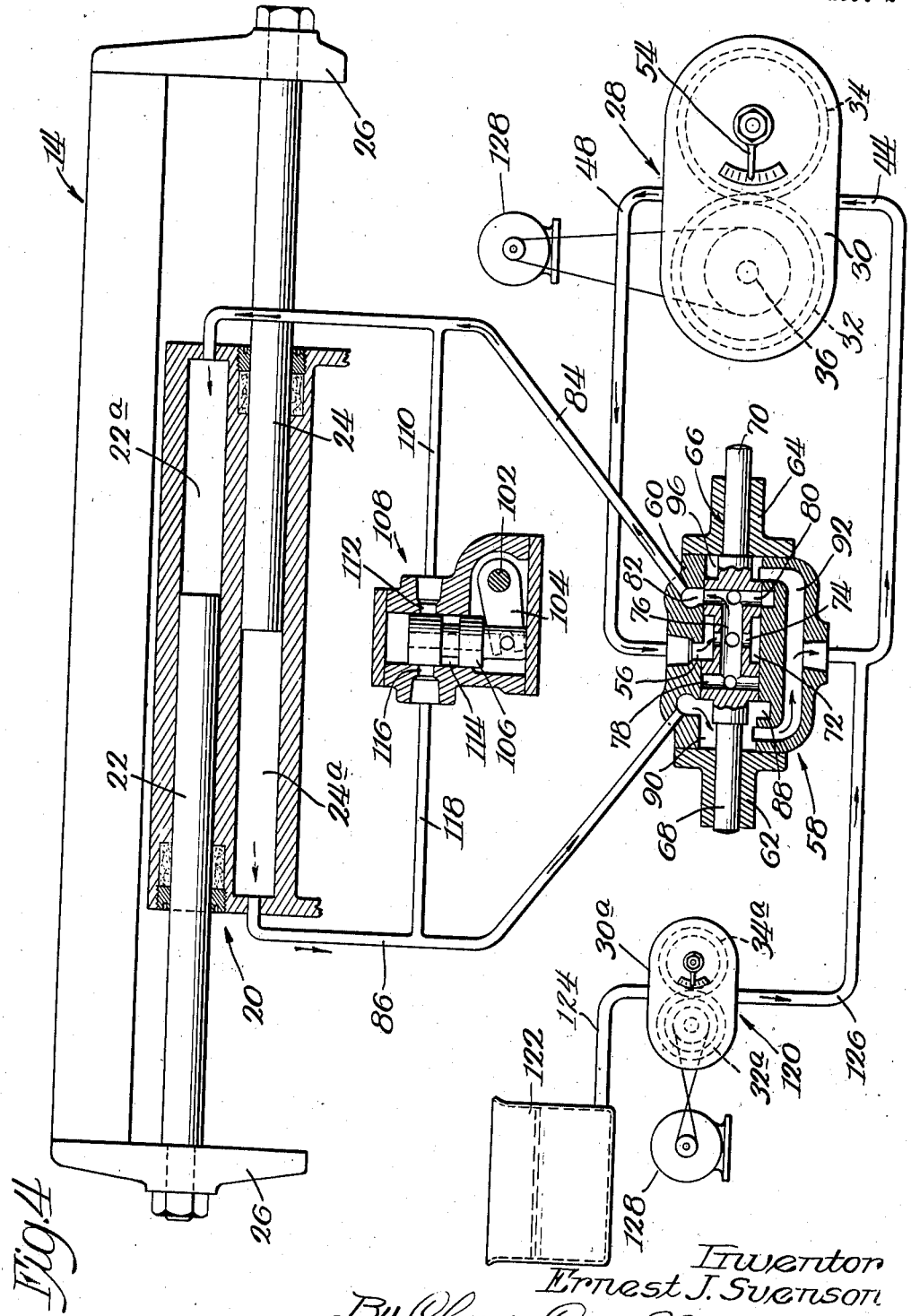
Inventor
Ernest J. Svenson
By Cheever, Cox & Moore Attys Patented June 11, 1935

2,004,399

UNITED STATES PATENT OFFICE 2,004,399

FLUID TRANSMISSION

Ernest J. Svenson, Rockford, Ill.

Application December 26, 1930, Serial No. 504,810

12 Claims. (Cl. 60—52)

My invention relates generally to material working apparatus, and more particularly to hydraulic systems of control therefor.

It is one of the objects of my present invention to provide a hydraulic system of control, in which an improved practical closed circuit serves to control the shifting of a machine element, such as a work supporting carriage or the like.

More specifically, it is an object of my invention to provide an improved closed hydraulic circuit as set forth above, which is particularly adaptable for use in connection with the reciprocation of a machine element, as, for example, the reciprocation of a table in a metal working machine, such as a grinding machine.

My invention also contemplates a new and improved adaptation for high displacement pumping devices, such as gear pumps and the like, by using said pumps in a circuit as set forth above for effecting the movement of a shiftable or reciprocable machine element.

Another object of my present invention is to employ a pump, such as a gear pump, in a circuit so that said pump will operate as a lock to prevent the shifting of the propelling fluid body in a closed circuit under certain conditions, and under other conditions to effect the flow of fluid in said circuit.

A still further object of my invention is to provide, in combination with a relatively large displacement pumping mechanism and conduits connecting same with a machine element, a simple and effective control valve mechanism.

In addition to the above mentioned advantageous structural features, my invention contemplates the provision of a new and improved means for taking care of any losses due to leakage in the low pressure side of the circuit resulting from wear in the reciprocating parts, and to this end I propose to employ a continuously operating pump, such as a gear pump.

Still another object of my invention is to provide, in combination with a shiftable machine element or the like, an improved hydraulic actuator system which includes a pump, such as a gear pump, for imparting rapid traverse to the machine element, and a second pump of smaller displacement which is adapted to take care of any possible leakage resulting from wear in the reciprocating parts, but which is sufficiently impositive in action to permit the return of fluid therethrough to a suitable reservoir without affecting the functioning of the main pump.

The foregoing and numerous other objects and advantages will be more apparent from the following detailed description when considered in connection with the accompanying drawings, wherein—

Figure 1 is a fragmentary elevational view of a material working apparatus or grinding machine and certain of the fragmentary hydraulic control elements associated therewith, said machine being representative of one type which may be hydraulically controlled in a very efficient manner by practicing the teachings of my present invention;

Figure 2 is an enlarged central sectional view of the main propelling pump for imparting rapid traverse to the machine carriage;

Figure 3 is a fragmentary enlarged sectional view of the pump employed to continuously maintain a predetermined pressure in the low pressure side of the main control circuit; and Figure 4 is a semi-diagrammatic representation of my improved hydraulic actuator system, the reversing and starting and stopping valves being shown in section in order to more clearly understand the functioning thereof.

Referring now to the drawings more in detail, wherein like numerals have been employed to designate similar parts throughout the various figures, it will be observed that for the purpose of illustrating one practical embodiment of the invention, and not in any sense by way of limitation, I have disclosed fragmentarily certain portions of a material working apparatus or grinding machine, which I have designated generally by the numeral 10, Figure 1. This grinding machine includes a suitable base 12 and a work supporting carriage 14, which is reciprocable upon the upper portion of said base. Extending upwardly from the base 12 is a frame 16 which supports a suitable cutting element or grinder wheel 18. Rotation may be imparted to the grinder wheel 18 by any suitable means, such as an electric motor or the like (not shown), and reciprocation to the work supporting carriage 14 is occasioned by means of a hydraulic actuator system, about to be described.

This hydraulic actuator system of control includes a cylinder 20, Figure 4, which may be housed within the base 12 and beneath the reciprocable carriage or machine element 14. Pistons 22 and 24 are reciprocable within their respective cylinder chambers 22a and 24a, and connect at their outer extremities with brackets 26 depending from and secured to the opposite extremities of the carriage 14.

In a grinding machine of the type shown the work piece (not shown) is mounted in any suitable manner upon the carriage 14, and said carriage is then shifted so as to reciprocate the supported work piece beneath the cutting tool or grinder 18. In order to effect the reciprocation of the pistons 22 and 24 and thereby control the reciprocation of the carriage 14, I employ a suitable main pump, which I have designated generally by the numeral 28. In the disclosed embodiment, this pump 28 is similar to the pump disclosed in my copending application, Serial No. 430,868, filed February 24, 1930, now Patent Number 1,912,737 which is of the variable displacement type. This pump 28 includes a suitable housing 30 and a pair of meshing gears 32 and 34 suitably mounted within said housing. The gear 32 is mounted upon and driven by a drive shaft 36, and the gear 34 is mounted upon a valve member 38 which is provided with a peripheral port 40.

Fluid is introduced or delivered to an intake chamber 42 of the pump 28 from a pipe line 44, and when the gears 32 and 34 rotate in the direction indicated by the arrows, Figure 2, the introduced fluid is carried along the periphery of the gears and compressed within the discharge chamber 46 which connects with a suitable pipe line 48. The gear 34 is provided with radial ports 50 and 52 which serve to receive fluid trapped between the meshing gear teeth, and these ports communicate with the valve port 40, as clearly shown in Figure 2. The valve 38 may be adjusted by manipulating a suitable control handle 54, Figure 4, so as to adjust the position of the valve port 40. In this manner I am able to adjustably control or regulate the displacement of the pump 28. Thus, if the valve 38 is shifted in a counter-clockwise direction, I am able to effect the delivery of a certain portion of the fluid from the high pressure or discharge chamber 46 to the low pressure or intake chamber 42, and in this manner regulate the displacement of the pump. For a more detailed explanation of the functional characteristics of this pump reference is again made to my above mentioned patent.

Fluid under pressure, which is received by the pipe line 48, is delivered to an intake port 56 of a suitable reversing valve, which I have designated generally by the numeral 58. This valve includes a central valve casing 60 and end casing sections 62 and 64, which are secured in any suitable manner to the central section 60. Reciprocable within these valve casings is a valve member 66, which includes an intermediate cylindrical section and reduced cylindrical end sections 68 and 70 formed integral therewith. When the valve 66 occupies the position shown in Figure 4, fluid from the pipe 48 is directed through the port 56, which is in continuous communication with a central annular valve port 72. Fluid from this annular port 72 passes through radial ports 74 and then into a central longitudinal passage 76. The left extremity of this passage 76 communicates with radial ports 78, which at this instant are closed by the valve casing 60. The opposite extremity of the passage 76 communicates with radial ports 80, which at this instant register with an annular port 82. A pipe line 84 is connected with this annular port 82, and thus fluid is directed by said valve from the pump 28 into the pipe line 84, which is connected with the right end of the cylinder chamber 22a. Thus, by directing fluid into the cylinder chamber 22a, the carriage 14 is urged to the left, Figure 4.

Fluid from the cylinder chamber 24a is ejected through the action of the piston 24 and is directed through a pipe line 86 which connects with an annular port 88 of the valve 58. This annular port 88 is now in communication with a valve chamber 90, and this chamber communicates with the return pipe line 44 through a two-branch passage 92.

When the carriage 14 approaches the limit of its movement to the left, a depending dog 94 adjustably mounted upon said carriage is moved into engagement with the right end of the reduced cylindrical section 70 of the valve member 66, as clearly shown in Figure 1, thereby causing said valve member to be shifted to the left. In this shifted position the direction of fluid flow within the pipe lines 84 and 86 is reversed, thereby causing the carriage to be shifted to the right. Fluid returned by the pipe line 84 is now directed by the annular port 82 to a valve chamber 96, which communicates with the return pipe 44 through the two-branch passage 92. When the carriage 14 reaches the limit of its movement to the right, Figure 1, a dog 98 adjustably mounted upon said carriage engages the left end of the valve member and thereby effects the automatic reversal of the carriage.

Attention is directed to the fact that as the valve 66 shifts to the left from its position shown in Figure 4, communication between the valve chamber 90 and the conduit or pipe line 86 is restricted and likewise communication between the pipe line 84 and the radial port 80 is restricted. Thus, the propelling effectiveness of the fluid in the pipe line 84 is decreased, and this results in a slowing down of the table 14. In view of the fact that the valve 66 is subjected to balanced fluid conditions at either end thereof, very slight power is required to shift it. Thus, the momentum of the carriage 14 is sufficient to carry the valve to its extreme left position. It should also be noted that the annular ports 82 and 88 are never completely cut off; that is to say, the width of these ports is greater than the thickness of the metal at each end of the valve 66 adjacent the radial ports 78 and 80. Therefore, when the valve 66 approaches its central position in its movement to the left, fluid pressure developed by the gear pump 28 will have a breaking effect upon the actuator piston 24, but the momentum of the carriage 14 will be sufficient to shift the valve to its extreme left position.

From the foregoing it will be apparent that my invention contemplates the provision of a closed hydraulic circuit for effecting reciprocation of a machine element, such as the carriage 14, and this closed circuit includes the gear pump 28, the hydraulic actuator including the pistons 22 and 24, the connecting pipe lines, and the reversing valve 58. By driving the pump 28 at a predetermined desired speed and having the valve 38 properly adjusted, a definite uniform displacement of fluid to the intake side of the cylinder 20 is obtained, and the same uniform displacement of fluid from the discharge side of the cylinder takes place, said discharge fluid being directed to the intake side of the pump 28. No fluid leaks from one side of the pump to the other through the meshing teeth of the gears, and hence it may be stated that the pump 28 displaces at a uniform rate a predetermined body of fluid to effect the movement of the carriage in a given direction, and receives the same predetermined volume of fluid from the discharge side of the carriage actuator. The fluid cannot be discharged from the pump any faster than it is received, nor can it be received any faster than it is discharged. Therefore, if no leakage takes place in the actuator, a predetermined volume of fluid is maintained in the circuit, and the entire body of fluid in the circuit is subjected to a reversal of flow upon each actuation of the reversing valve.

In order to render the constantly driven gear pump 28 functionally inoperative, it is only necessary to swing a control handle 100 conveniently positioned at the front of the machine, as shown in Figure 1, to the right. This handle 100 is mounted upon a shaft 102, which carries an arm 104, Figure 4, and the outer end of this arm makes a slotted connection with the lower extremity of a valve member 106, and this valve member forms a part of a mechanism, which I have termed a starting and stopping valve, denoted generally by the numeral 108. When the valve 106 is shifted upwardly, the closed circuit just described is short circuited, and fluid is free to flow from one side to the other. Thus, for example, if the reversing valve is positioned as shown in Figure 4, and the starting and stopping valve 108 is actuated so as to shift the valve member 106 upwardly, communication is established between the pipe line 84 and the pipe line 86 through a pipe or conduit 110, a valve port 112, an annular valve port 114, a valve port 116, and a pipe or conduit 118. By permitting this short circuiting to take place, the fluid will follow the path of least resistance, and hence will circulate between the pipe lines 84 and 86 without developing a pressure within the cylinder chambers 22a and 24a sufficient to effect the shifting of the carriage 14. As soon as the control handle 110 is again shifted to the left and the valve member 106 is lowered, communication between the pipe lines 84 and 86 is closed and the pump 28 again rendered functionally operative to effect reciprocation of the machine carriage.

Attention is now directed to a pump 120, which is similar in structural characteristics to the gear pump 28. The displacement of the pump 120 is considerably less than the displacement of the main pump 28. This gear pump 120 includes a casing 30a corresponding to the casing 30 of the pump 28 and a pair of gears 32a and 34a, the gear 32a being mounted upon and driven by a suitable drive shaft 36a and the gear 34a being rotatably mounted upon an adjustable valve 38a, which valve is provided with a peripheral port 40a. Fluid is directed to an intake chamber 42a of the pump 120 from a suitable reservoir 122 through a pipe or conduit 124. Fluid from the intake chamber 42a is carried along the periphery of the gears and subjected to increased pressure within a discharge chamber 46a, and from this chamber the fluid may be directed through a pipe line 126 which connects with the pipe line 44. It should be noted that the valve 38a of the pump 120 is so positioned that the port 40a thereof will permit fluid from the discharge chamber 46a to be conducted through radial passages or ports 50a and 52a to the intake chamber 42a. By employing this construction, the pump 120 is rendered impositive in action; that is to say, said pump is driven so as to set up a predetermined necessary pressure within the pipe line 126 to take care of any possible leakage in the carriage actuator, and if additional fluid to take care of leakage is not required, the valve port 40a permits the continuous circulation of fluid from the high pressure to the low pressure side of the pump 120. The size of the ports within the pump 120 is sufficiently restricted so that the operating pressures within the closed circuit described above is continuously maintained. The pumps 28 and 120 may be continuously driven from a common source of power supply, for example, a suitable electric motor 128 shown diagrammatically in Figure 4, and which may be mounted within the machine structure in a conventional manner. As stated above, the displacement of the pump 120 need be very small in comparison with the displacement of the pump 28. In order to more clearly disclose the structural features of these pumps, I have shown the same in Figures 2 and 3 as being of substantially the same size. However, variations in the relative sizes of the pumps will depend entirely upon the pressures, etc., which are to be maintained within the operating circuit.

From the foregoing description it will be apparent that my invention contemplates the provision of a new and improved closed circuit, which is capable of employing a high displacement pump therein, such as a gear pump. The arrangement of the operating circuit described above is such that the main gear pump serves to lock the fluid body on each side of the circuit; that is to say, the fluid body in the low pressure side of the circuit functions entirely independent of the fluid body in the high pressure side of the circuit, and vice-versa. By employing my invention, a relatively high displacement pump, such as a gear pump, may be very effectively employed to impart rapid traverse to machine elements. Reciprocating rapid traverse movements of machine elements is particularly practical in machines, such as grinding machines, where it is desirable to effect relative reciprocation between the cutting tool or grinder and the work piece. My invention has a very practical application in such instances. The simple arrangement of the control valves, including the reversing valve and the starting and stopping valve, enables my system of hydraulic control to be very economically produced.

The gear pump 120 for taking care of any leakage in the operating circuit, presents a very practical arrangement, and is superior in functional characteristics to other mechanical devices, such as spring devices, which have been employed heretofore in some fluid circuits. Either the pump 28 or the pump 120 may be adjusted to vary the displacement thereof by a simple shifting of an externally positioned hand lever, and these pumps are of extremely simple and practical design. They are so arranged as to relieve against the development of pressures and slippage between the gear teeth, and as such eliminate the development of heat within the fluid body. The gear pumps may be driven from a common source of power supply, and in instances where it is desirable, said pumps, as well as the grinding wheel 18, may be driven from a common driving mechanism, such as an electric motor.

My improved system of control is particularly well adapted for use with grinding machines, where it is desirable to impart relative movement between a work supporting carriage and a grinder wheel. Thus, for example, in the type of grinding machines disclosed in the drawings, particularly Figure 1, where the work is supported by the carriage and reciprocated past the grinder wheel 18, the movement of the carriage must be absolutely uniform. If the carriage experiences non-uniform or stuttering movement, a wavy surface instead of an absolutely smooth surface is ground upon the work piece. My invention provides a system of hydraulic control, wherein the desired uniform movement of the work supporting carriage is obtained. In the drawings I have disclosed the carriage 14 as being reciprocable in given directions, but obviously the carriage may be moved in directions which vary from that disclosed in the drawings, by employing the teachings of my invention.

While I have disclosed a particular metal working apparatus or grinder for the purpose of illustrating one practical application of my invention, it should be clearly understood that said invention is by no means limited to such a machine structure, nor is the invention limited to the other specific structural features disclosed in the drawings, but is capable of other modifications and changes without departing from the spirit and scope of the appended claims.

Having thus described my invention, what I claim as new and desire to secure by Letters Patent is:

1. In material working apparatus, a work support, a cutting tool, said work support and cutting tool being relatively movable, a hydraulic actuator for effecting relative movement between the work support and the cutting tool, a constant speed variable displacement gear pump connected in a closed circuit with said actuator, the pressure maintained at the gear pump exhaust being substantially the same as the pressure of the fluid which propels the actuator, pump means for maintaining pressure at the intake side of the gear pump, the pressure thus maintained counteracting the suction effect at the gear pump intake, a reservoir for supplying fluid to said pump means, and a valve mechanism for controlling the reversal of said actuator, said valve being operable in response to the shifting of said actuator.

2. In material working apparatus, a work support, a cutting tool, said work support and cutting tool being relatively movable, a hydraulic actuator for effecting relative movement between the work support and the cutting tool, a constant speed variable displacement gear pump connected in a closed circuit free from relief valves with said actuator whereby a pressure is maintained at the gear pump exhaust which is substantially the same as the pressure of the fluid serving to propel the actuator, a reservoir, and pump means interposed between the gear pump and said reservoir for maintaining communication between said gear pump and reservoir and for maintaining pressure at the intake of the gear pump to counteract suction effects.

3. In a hydraulic actuator system, a reciprocable hydraulic actuator, a gear pump, means connecting said gear pump directly with said actuator without the use of relief valves, whereby the volume of fluid displaced by the gear pump to the intake side of the actuator is substantially equal to the volume of fluid received by the gear pump from the discharge side of said actuator and whereby a pressure is maintained at the gear pump exhaust which is substantially the same as the pressure of the fluid serving to propel the actuator, and a second pump for maintaining pressure at the intake side of the gear pump to counteract suction effects at the gear pump intake and for maintaining communication between said gear pumps and the intake side of said second pump.

4. In a hydraulic actuator system, a reciprocable hydraulic actuator, a gear pump for imparting movement to said actuator, means connecting said gear pump with said actuator, and a variable displacement gear pump of lower displacement than the first mentioned pump for supplying fluid to maintain a fluid body under pressure between the actuator and the intake of said first mentioned gear pump and thereby take care of any leakage in said actuator and also to counteract suction effects at the intake of said first mentioned gear pump.

5. In material working apparatus, a work support, a cutting tool, said work support and cutting tool being relatively movable, a hydraulic actuator for effecting relative movement between the work support and the cutting tool, a gear pump connected in a closed circuit with said actuator by ducts free from relief valves whereby to enable the pressure at the gear pump discharge to be maintained substantially the same as the pressure of the fluid which propels the actuator, means for short-circuiting said closed circuit to arrest the movement of said actuator, a reservoir, and pump means for receiving fluid from said reservoir and impositively urging said fluid toward the intake of said gear pump.

6. In material working apparatus of the class described, a grinder, a work supporting carriage for reciprocating a work piece past said grinder, a hydraulic actuator for reciprocating said carriage, a variable displacement gear pump connected in a closed circuit with said actuator, and a valve mechanism for controlling the reversal of said actuator, said valve mechanism including a normally balanced valve member shiftable solely in response to the movement of said carriage.

7. In a hydraulic actuator system, a hydraulic actuator including a piston within a cylinder, a variable displacement gear pump for propelling said actuator, and a second variable displacement gear pump connected with the intake side of the first mentioned pump for maintaining a slowly migrating body of fluid under pressure at the intake side of said first gear pump.

8. In a hydraulic actuator system, a hydraulic actuator including a piston within a cylinder, a variable displacement gear pump for propelling said actuator, a second variable displacement gear pump connected with the intake side of the first mentioned pump for maintaining a fluid body under pressure at the intake side of said first gear pump, and means for adjusting the displacement of one of the gear pumps independently of the other.

9. In a hydraulic actuator system, a hydraulic actuator including a cylinder and a piston therein, a gear pump for propelling said actuator, a shiftable valve for controlling the direction of flow of fluid from said gear pump to said actuator, and a second pump connected with the intake side of said gear pump and adapted through the agency of said valve to communicate with the return side of said actuator, whereby to maintain fluid pressure within the return side of said actuator and the intake side of said gear pump to counteract suction effects at the gear pump intake.

10. In a hydraulic actuator system, a hydraulic actuator including a piston and cylinder construction, a gear pump, a duct free from relief valves connecting the discharge side of said pump with one side of said actuator, a duct free from relief valves connecting the intake side of said pump with the other side of said actuator whereby to connect said actuator and pump in a closed circuit, the gears of said pump having means for relieving against fluid pressure developed at the meshing zone of the gear teeth and for preventing the slippage of fluid from the high to the low pressure side of the pump through said meshing teeth whereby to enhance the operative effectiveness of said closed circuit, and means for controlling the operative functioning of said pump with respect to said actuator.

11. In a hydraulic actuator system, a hydraulic actuator for propelling machine tools and the like, a pump, a duct free from relief valves extending between the discharge of said pump and the intake of said actuator, a similar duct connecting the opposite sides of said actuator and pump, a fluid reservoir, means interposed between said reservoir and the intake of said pump including a second pump for maintaining fluid pressure at the intake side of the first pump and means for continually maintaining communication between the reservoir and the intake side of the first pump without affecting the operative functioning of the second pump to maintain pressure, whereby to effectively counteract suction effects produced at the intake side of the first pump and thereby preclude the entrance of air within the system, and valve means for controlling the direction of fluid delivery to said actuator.

12. In combination with a shiftable machine element, a hydraulic actuator for shifting said element, a source of fluid supply, a pump for receiving fluid from said source and delivering the fluid to said actuator, a valve mechanism including a valve member shiftable between at least two positions for controlling the direction of fluid flow to said actuator, and means shiftable with said machine element and adapted to engage the structure of the valve member when said element reaches a predetermined position to thereby cause said valve member to be shifted from one to another of said positions, said means providing the sole propelling medium for said valve member.

ERNEST J. SVENSON.